United States Patent
Shurley

[11] 3,757,454
[45] Sept. 11, 1973

[54] TOP-WATER FISHING PLUG

[76] Inventor: Robert G. Shurley, P.O. Box 223, Meadville, Miss. 39653

[22] Filed: Nov. 16, 1971

[21] Appl. No.: 199,145

[52] U.S. Cl............ 43/42.16, 43/42.31, 43/42.48
[51] Int. Cl.............................................. A01k 85/00
[58] Field of Search.................. 43/42.16, 42.31, 43/42.45, 42.48, 42.47

[56] References Cited
UNITED STATES PATENTS

| | | | |
|---|---|---|---|
| 2,262,974 | 11/1941 | Steiner | 43/42.31 X |
| 2,734,301 | 2/1956 | Fuqua | 43/42.16 X |
| 1,801,940 | 4/1931 | Stanley | 43/42.28 |
| 2,295,765 | 9/1942 | Weber | 43/42.31 X |
| 2,561,040 | 7/1951 | Arbogast | 43/42.31 |
| 2,100,289 | 11/1937 | Khoenle | 43/42.48 |
| 2,449,700 | 9/1948 | Hubbard | 43/42.48 X |

Primary Examiner—Russell R. Kinsey
Assistant Examiner—James H. Czerwonky
Attorney—D. C. Roylance et al.

[57] ABSTRACT

A tapered, elongated top-water plug, equipped with a tail spinner, provides two alternative actions, depending upon line pull applied. The upper portion of the nose of the plug is forwardly concave, while the lower portion is substantially convex and slants downwardly and rearwardly. When pulled gently, the concave portion of the nose remains above water and the plug glides smoothly, with the tail spinner operating. When pulled with a slight jerk, the concave nose portion is pulled suddenly into the water, causing the abrupt noise and water commotion characteristic of "plunker" type plugs.

2 Claims, 3 Drawing Figures

PATENTED SEP 11 1973 3,757,454

TOP-WATER FISHING PLUG

BACKGROUND OF THE INVENTION

Top-water plugs have long been accepted as proven lures for game fish such as fresh water bass, and prior-art workers have devised many such lures with configurations designed to provide some particular action, during retrieving of the lure, to make the lure more attractive to game fish. Many such plugs have been equipped with one or more spinners or flashers which are actuated by movement of the plug over the surface of the water. Other top-water lures have been specially designed to cause an observable commotion in the water when jerked, such action usually including both visual disturbance of the water and an abrupt sound. While such top-water plugs have been highly successful and are widely accepted by fishermen, no top-water plug has heretofore been provided which allows the fisherman to elect, after having made a cast, between the two types of action, i.e., the smooth retrive with the spinner operating, or the combined sound and visual disturbance.

OBJECTS OF THE INVENTION

A general object of the invention is to provide a top-water fishing lure which allows the user to elect between two distinctly different actions of the lure simply by the manner of retrieving the lure.

Another object is to devise a top-water plug which can be either gently retrieved, with only a gliding action accompanied by operation of a spinner, or moved abruptly, with the noise and disruptive action of a "plunker" type plug.

A still further object is to provide a dual mode of action top-water plug without an attendant increase in cost of manufacture.

SUMMARY OF THE INVENTION

Broadly stated, fishing lures according to the invention comprise a buoyant lure body, equipped with hooks and a tail spinner, the nose of the lure body including an upper forwardly concave portion and a lower portion which slants downwardly and rearwardly, the body having such buoyancy that the concave portion of the nose is above water when the plug is floating at rest, and the point of line connection being above the junction between the concave portion and the downwardly and rearwardly slanting portion of the nose, so that an abrupt pull or jerk will cause the lure to tip forwardly until the concave nose portion enters the water.

In order that the manner in which the foregoing and other objects are achieved according to the invention can be understood in detail, one particularly advantageous embodiment thereof will be described with reference to the accompanying drawings, which form a part of the original disclosure of this application, and wherein.

Figure 1:
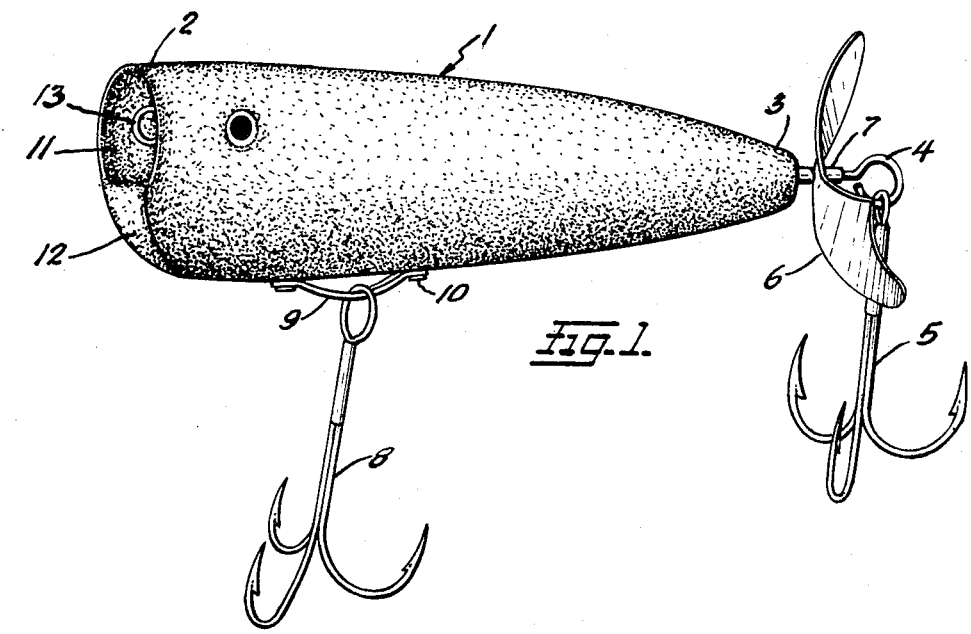
FIGS. 1 and 2 are perspective views of the fishing plug.

Referring now to the drawings, the embodiment of the invention illustrated is a top-water plug having a buoyant body 1 of generally curviform transverse cross-section which is uniform from the nose 2 throughout a major part of the length of the body and which then decreases toward the tail 3, so that the body is smoothly tapered rearwardly. A screw eye 4 is inserted in the tail of the body 1 to secure the trailing treble hook 5. A portion of the shank of the screw eye is exposed and passes freely through an opening in the hub of a propeller type spinner 6, a bead 7 being provided on the shank between the spinner and the hook-attaching eye to act as a bearing for the spinner.

A second treble hook 8 is provided in usual fashion, being secured to the underside of body 1 by an attaching plate 9 and screws 10.

Figure 3:
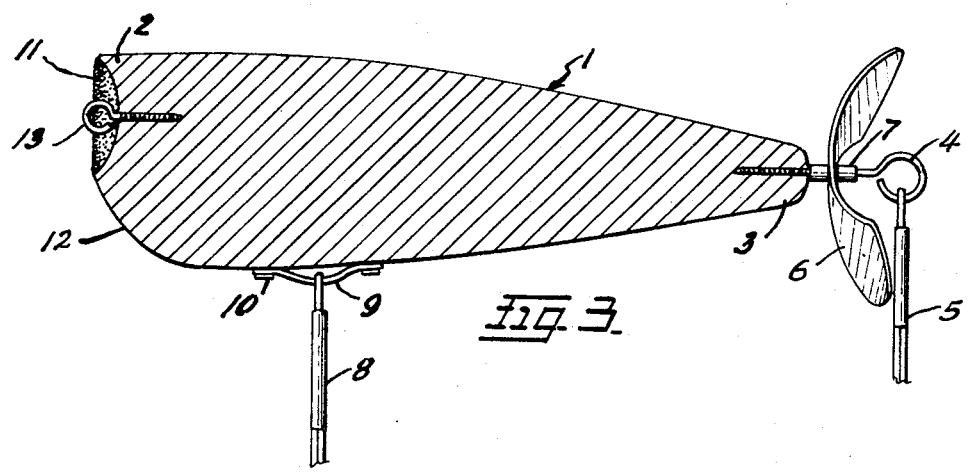
FIG. 3 is a longitudinal sectional view thereof.
Figure 2:
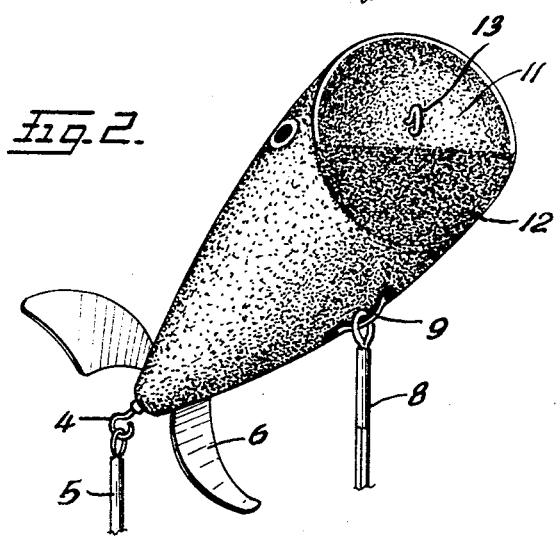

The frontal surface of the nose 2 of the body 1 is divided into an upper, forwardly opening, concave portion 11 and a lower, downwardly and rearwardly slanting portion 12. As seen in FIGS. 1 and 3, portion 11 is transverse, i.e., approximately at right angles to the longitudinal axis of the body 1, while portion 12 curves downwardly and rearwardly. A screw eye 13 is secured within the confines of concave portion 11 for attachment of the plug to the leader or line, as by the usual snap-swivel.

Body 1 can be fabricated from any suitable material, typically a rigid or slightly flexible polymeric material, having a density such that, with the hooks, spinner and screw eyes in place, the complete lure will have a positive buoyancy such that it will float with the concave nose portion 11 above the water. With typical configurations of body 1, the body will float slightly "tail down," due to the tapered tail and the combined weight of screw eye 4, hook 5, spinner 6 and bead 7, and the nose 2 will therefore be elevated slightly. Accordingly, with such body configurations, the concave nose portion 11 can make up from one-half to as much as two-thirds of the total frontal area of the nose of the body 1 and still be above the surface of the water when the plug is floating at rest.

When the plug has been cast and is to be retrieved, a gentle pull of the line on screw eye 13 will cause the plug to tilt forwardly only slightly, with the concave nose portion 11 remaining substantially clear of the water. Such a gentle retrieve can be accomplished, e.g., by slowly reeling, and will cause the plug to glide along the surface of the water, with the downwardly and rearwardly slanting lower nose portion 12 having a planing effect, and with the tail spinner 6 rotating in conventional fashion. Even with a somewhat faster retrieve, this gliding, spinner-only action can be retained by raising the rod tip to minimize the tendancy for the line pull to cause the plug to dip or tip forwardly.

When a more violent, disruptive and noisy action of the plug is desired, a quick, short jerk on the line, applied either by rod movement or sudden fast reeling, or a combination of the two, will cause the plug to tilt forwardly, bringing the concave nose portion 11 through the surface of the water, with the resulting noise and splash commonly achieved with conventional plugs of the "plunking" type. Such tilting action is assured by location of the screw eye 13 at a point not only within concave nose portion 11 but also above the water line and above the center of gravity of the plug. Employing a body configuration such as that illustrated, so that the plug floats slightly "tail down" when at rest, is a further aid to assuring that a sudden pull will cause the dipping or forward tilting movement necessary to bring the concave nose portion through the water surface.

While the embodiment chosen to illustrate the invention employs a 2-treble hook arrangement and a propeller spinner, it will be understood by those skilled in the art that other hook arrangements and other types of tail spinners or flashers can be employed without departing from the scope of the invention. What is claimed is:

1. In a top-water fishing plug capable of exhibiting two different actions depending upon the manner in which the plug is retrieved, the combination of an elongated, tapered buoyant body having a nose and a trailing end,
the frontal surface of said nose comprising an upper transverse portion which is concave and a lower substantially convex portion which curves downwardly and rearwardly;

spinner means;

a trailing hook;

means operatively mounting said spinner means and said trailing hook on said body at the trailing end thereof,
said body tapering rearwardly toward said trailing end and the combination of the tapered configuration and the weight of said spinner means and trailing hook causing the plug to float in a position in which said body is inclined downwardly and rearwardly, to assure that said concave upper portion of the nose will be clear of the water, when the plug is floating at rest; and line attaching means secured to the nose of said body at a point above said lower portion of the nose;

the downward and rearward inclination of the plug at rest and the downwardly and rearwardly curved shape of the lower portion of the nose allowing the plug to be retrieved gently by a pulling force applied to the line attaching means, said lower portion of the nose of said body then causing the body to plane so that the plug exhibits a stable gliding action accompanied by operation of said spinner means; and a sudden jerk applied to said line attaching means when the plug is floating at rest being effective to cause said body to dip forwardly, moving said concave upper portion of the nose through the surface of the water to create an abrupt noise and commotion.

2. The combination defined in claim 1, wherein said concave upper portion makes up from one-half to two-thirds of the total frontal area of the nose of said body.

* * * * *